United States Patent

Johnson

[15] 3,688,660
[45] Sept. 5, 1972

[54] SAFETY OVERRIDE FOR FLASH LAMP INDEXING COMPONENTS OF AN EXPOSURE MECHANISM

[72] Inventor: Bruce K. Johnson, Andover, Mass.

[73] Assignee: Polaroid Corporation, Cambridge, Mass.

[22] Filed: Dec. 8, 1970

[21] Appl. No.: 96,088

[52] U.S. Cl. ................... 95/11 L, 240/1.3, 240/37.1, 339/147
[51] Int. Cl. ........................................... G03b 15/03
[58] Field of Search ..... 95/11 R, 11 L, 11.5; 240/1.3, 240/37.1; 339/147

[56] References Cited

UNITED STATES PATENTS

| 3,353,468 | 11/1967 | Beach | 240/1.3 X |
| 3,353,466 | 11/1967 | Charney | 240/1.3 X |
| 3,398,389 | 8/1968 | Fischer et al. | 240/1.3 X |
| 3,354,300 | 11/1967 | Parsons et al. | 240/1.3 |

FOREIGN PATENTS OR APPLICATIONS 1,497,411   5/1969   Germany.................95/11 L Primary Examiner—Samuel S. Matthews
Assistant Examiner—Robert P. Greiner
Attorney—Brown and Mikulka, Gerald L. Smith and William Roberson

[57] ABSTRACT

Photographic apparatus for use with a flash cube indexing mechanism incorporating safety override features. In an important embodiment, a flash cube indexing mechanism is linked to the shutter of a camera. When the flash cube is improperly rotated in either direction from a source external to the camera, an override feature permits the improper rotation without damage to either the shutter or the indexing mechanism.

15 Claims, 17 Drawing Figures

INVENTOR.
BRUCE K. JOHNSON
BY Brown and Mikulka
ATTORNEYS

PATENTED SEP 5 1972  3,688,660

INVENTOR.
BRUCE K. JOHNSON
BY Brown and Mikulka
ATTORNEYS

*INVENTOR.*
BRUCE K. JOHNSON
BY Brown and Mikulka
ATTORNEYS

PATENTED SEP 5 1972 3,688,660

*INVENTOR.*
BRUCE K. JOHNSON

BY *Brown and Mikulka*

ATTORNEYS

SAFETY OVERRIDE FOR FLASH LAMP INDEXING COMPONENTS OF AN EXPOSURE MECHANISM

BACKGROUND OF THE INVENTION

Artificial illumination for photographic cameras is popularly provided by multi-lamp flash assemblies which are removably mounted at some convenient location upon the camera housing. Commonly known as "flash cubes," these packaged assemblies typically are cubic in form, incorporating four flash lamps in conjunction with cooperating reflector elements. By causing the packaged assemblies to be rotated, successive ones of the flash lamps are moved into or indexed to an operative position for exposure.

The rotative indexing movement conventionally is carried out by drive mechanisms contained within the camera housing. Usually, the drive mechanisms are coupled for operation in response to the performance of a camera operation; for instance, film winding or shutter actuation. Exemplary of the latter form of flash cube indexing rotation is an exposure mechanism described and claimed in a copending application entitled "Photographic Apparatus for Mounting a Multilamp Flash Unit," Ser. No. 50,379, jointly filed June 29, 1970, by Bruce K. Johnson and Donald H. Hendrey and assigned in common herewith.

In providing for flash cube rotation, a mechanical linkage or union necessarily exists between some drive components of a shutter or film winding mechanism and the flash cube mounting. Should an extraneous, externally generated rotational force be exerted upon the flash cube, the above-noted mechanical linkage will be moved in non-design fashion and usually under excessive nondesign forces. Damage to an associated shutter or link mechanism can easily ensue and camera repair is required.

Attempts by camera operators to rotate a mounted flash cube by grasping it externally are not improbable. Where such damage is caused to inexpensive, popularly-priced cameras, the cost of repair may be so high as to render such service impractical.

SUMMARY OF THE INVENTION

The present invention is addressed to a photographic apparatus for indexing a multi-lamp "flash cube" assembly in response to exposure mechanism actuation. This apparatus is immune to the destructive effects occasioned by an operator improperly rotating a mounted flash cube by grasping and turning it. The invention provides a rotational flash cube support assembly linked with an exposure mechanism which releases from the flash cube on the occasion of improper rotation.

In an important embodiment of the present invention, flash cube indexing is accomplished through a linkage between the exposure mechanism and the rotational support assembly. Upon improper rotation of the flash cube, this linkage is nondestructively severed for the period of improper rotation, and free flash cube rotation is permitted without destruction to either the exposure mechanism or the support assembly. The indexing and exposure components are isolated from destructive interference with such rotation.

Should the operator improperly rotate the flash cube in a direction coinciding with that of normal flash cube indexing, the invention provides for nondestructive severance of the indexing and support assembly linkage for the period of improper rotation, thereby permitting rotation of the flash cube and support assembly without interference to the exposure mechanism indexing assembly.

If the operator improperly rotates the flash cube in a direction opposite to that of normal flash cube indexing, the invention allows for severance of the indexing and exposure mechanism linkages whereby improper flash cube rotation does not interfere with the exposure mechanism.

As one feature of the invention, an escapement mechanism is incorporated with a rotational support assembly for indexably positioning a flash cube. If the operator improperly rotates the flash cube in a direction opposite to that of normal indexing, the escapement assembly overrides its indexing contacts thereby allowing for free flash cube rotation without damage to either the support assembly or the escapement mechanism.

One feature and object of the present invention is to provide an override system capable of allowing improper manual rotation of a flash cube associated with an automatic indexing system without destruction to either the indexing system or the flash cube.

Other objects of the invention will in part be obvious and will in part appear hereinafter.

The invention accordingly comprises the apparatus possessing features, techniques and properties which are exemplified in the description to follow hereinafter.

For a fuller understanding of the nature and objects of the invention, reference should be made to the following detailed description taken in connection with the accompanying drawings.

DETAILED DESCRIPTION OF THE INVENTION

In its preferred embodiment, the invention is incorporated within an exposure mechanism including a shutter assembly having a single shutter blade, the rest position of which serves to wholly block the passage of light through an exposure aperture. An exposure interval is commenced when the shutter blade is mechanically moved from its initial blocking position to a terminal unblocking position. Exposure termination is accomplished by the movement of the shutter blade from this terminal position to its initial position through the use of a spring which normally biases the shutter blade into the latter aperture blocking position. Such an exposure mechanism is described and claimed in a copending application for the U. S. Patent entitled "Exposure Control Mechanism with Mechanical Flash Synchronization," Ser. No. 50,583, filed June 29, 1970, by Bruce K. Johnson and assigned in common herewith.

In the discussion to follow, the terms "clockwise" and "counterclockwise" are used in a descriptive sense for the purpose of facilitating an understanding of the operation of the mechanism as viewed within the referenced drawings. These terms are not used in limitation of the disclosure.

During the initiation of an exposure interval, associated exposure mechanisms provide for the movement of a probe element into firing engagement with a percussible ignitable flash cube. Indexing of the flash cube is carried out subsequent to the termination of an exposure interval through the use of mechanism driven from the shutter of the camera. A mechanical linkage, therefore, is necessitated between the exposure mechanism and the flash cube. Upon total exhaustion of the flash lamps contained within a flash cube, the exposure mechanism automatically assumes a locked status preventing further actuation until the flash unit is removed.

Figure 1:
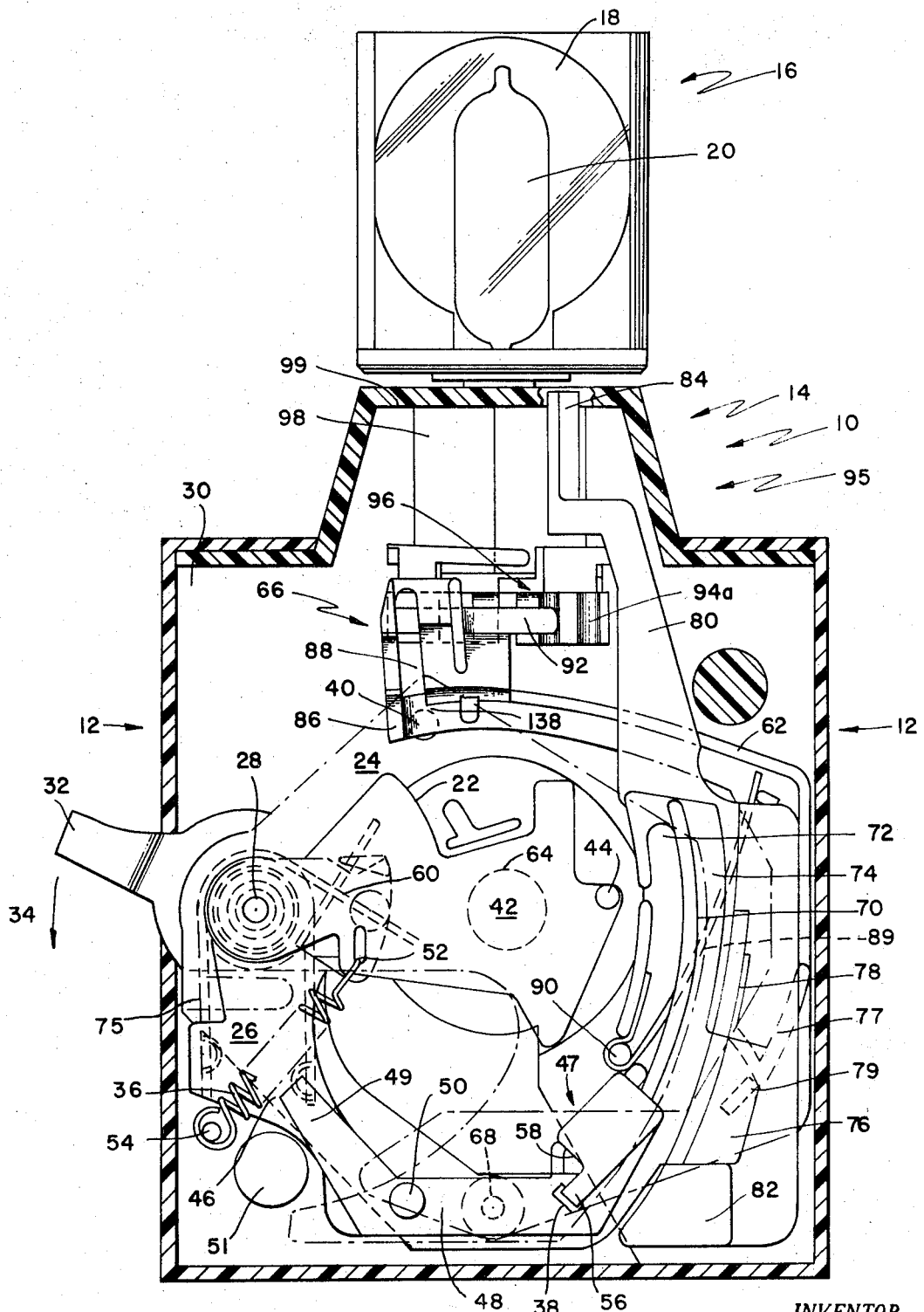
FIG. 1 is a front sectional view of the forward portion of a photographic camera showing an exposure mechanism according to the invention in a pre-exposure or rest orientation and having portions shown in phantom to reveal internal structures.

Referring to FIG. 1, a forward portion of the housing of a photographic camera is shown generally at 10. HOusing 10 is formed having side walls 12 which are configured to support an elevated platform at 14. Platform 14 provides structural support for components of a rotational support assembly which releasably retains a flash cube shown generally at 16.

Flash cube 16 is formed having a glass envelope 18 within which is contained a plurality of flash lamps 20. Each of the individual flash lamps 20 contains the usual shredded ignitable metal foil. Disposed through the bottom portion of the glass envelope and extending into the shredded ignitable metal foil is a hollow deformable base which contains a percussive material. Spring loaded firing pins are provided, which, when triggered or released, percussively strike and deform these cylindrical bases. When the base members are deformed, the percussive material contained therein ignites the shredded foil within the glass envelope of the lamp.

The shutter components of the exposure mechanism generally comprise a shutter blade 22, a loading arm 24, and an articulated power arm 26 which are all pivotally mounted upon a hub 28. Hub 28 is fixed by staking or the like into a supporting base plate 30. Actuation of the exposure mechanism is carried out by depressing a shutter release lever 32 in a direction shown by arrow 34. Shutter release lever 32 is formed integrally with loading arm 24 so that any movement of lever 32 is imparted to loading arm 24. Accordingly, with depression of lever 32, loading arm 24 is rotated about hub 28 in a counterclockwise direction.

Loading arm 24 is biased towards its pre-exposure terminal position by virtue of its abutting engagement with a flange (not shown) extending from spring biased power arm 26. At a lower portion of loading arm 24, there is provided an engaging tab 38 depending inwardly towards base plate 30. Extending inwardly from the uppermost portion of loading arm 24 is a pin 40.

Shutter blade 22 is pivotally mounted upon hub 28 immediately behind loading arm 24 and has a planar aperture blocking portion 42 as well as an inwardly extending cylindrical contact stud 44.

Power arm 26 is pivotally mounted upon hub 28 on the inward side of shutter blade 22 and is configured having two elements 46 and 48. Element 48 is pivotally mounted upon a stud 50 located at the tip of element 46. Power arm 26 is biased for rotation in a clockwise or downward direction by a spring 36. Spring 36 is connected between slot 52 in element 46 and stud 54 extending from base plate 30.

The outer tip portion 47 of power arm element 48 is formed to provide an outwardly extending engaging surface 56. As loading arm 24 is rotated upwardly by release lever 32, a tab 38 integrally formed thereon, engages surface 56 of power arm 26 and rotates it in a counterclockwise direction. Tip portion 47 is further configured having a shutter engaging latch surface 58 which, at an appropriate time during an exposure cycle, is operative to move into contact and engage with contact stud 44 of shutter blade 22. Shutter blade 22 is biased into its aperture blocking position by a spring 60 spirally wound about hub 28. One end of spring 60 is connected with a tab (not shown) of shutter blade 22 and the opposite end is arranged to engage with a contact flange (not shown) of power arm 26.

Pivotally mounted upon a pin 68, secured to the lower portion of base plate 30, is an advancing arm 62, which extends in a U-shaped fashion about the aperture 64 of the camera and which terminates at an indexing portion 66. Mounted upon hub 28 is a generally U-shaped firing arm 74 having an impulse tab 76 which is configured to ride in a slot 78 formed within a vertically movable probe element 80. The upward portion of firing arm 74 is configured to form a slot 72. Extending downwardly from slot 72 is a reinforcing rib 70. Probe element 80 is supported for vertical movement upon base plate 30 and is configured having a lower portion 82, vertical slot 78 and a striking tip 84 at its upward end.

Figure 17:
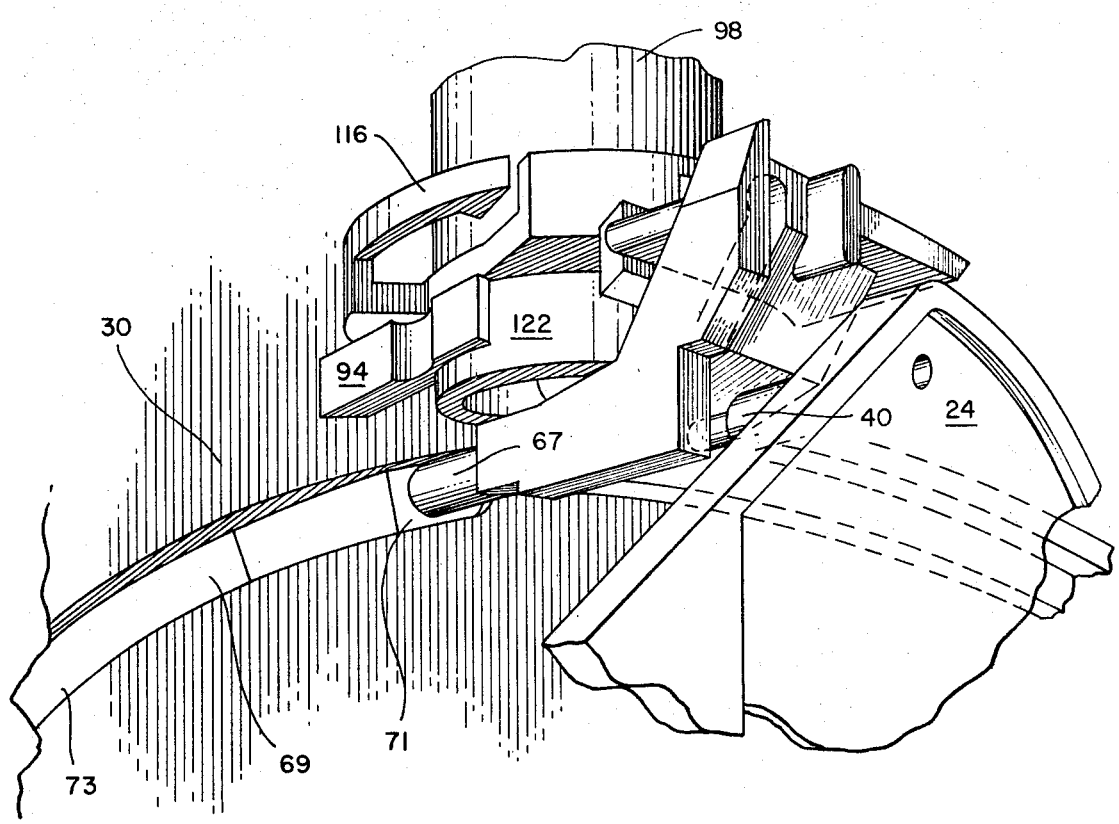
FIG. 17 is a perspective view of a portion of the apparatus of the present invention.

As loading arm 24 is rotated in a counterclockwise direction about hub 28, advancing arm 62 is rotated or pulled in a counterclockwise direction from a pin 40. Pin 40, integrally formed upon loading arm 24, is connectable in abutting engagement with indexing end 66 of advancing arm 62. Indexing end 66 of advancing arm 62 contains a rearwardly extending pin 67 which rides in a slot 69 formed with base plate 30 as illustrated in FIG. 17. Slot 69 is configured having a ramp contained therein with the shallowest part of the slot at point 71 and the deepest part of the slot at 73. Accordingly, as indexing end 66 is moved in a counterclockwise direction, pin 67 rides deeper into slot 69. The locus of travel of pin 67, therefore, makes indexing end 66 move rearwardly into base plate 30 and drop behind a contact surface 94 discussed below. As described earlier, at the same time that advancing arm 62 and loading arm 24 are being moved in a counterclockwise direction toward their terminal positions, tip portion 47 of power arm 26 is pulled along reinforcing rib 70 and into slot 72, located upon firing arm 74. Advancing arm 62 also serves to retain firing arm 74 while it is being spring loaded. This is accomplished with a restraining cam 77 integrally formed with advancing arm 62. As advancing arm 62 is rotated, the corresponding restraining cam 77 restrains firing arm 74 by sliding engagement with a tab 79, extending outwardly from firing arm 74. When advancing arm 62 reaches its terminal position, this engagement is released to allow spring loaded firing arm 74 to move in an upward direction under the influence of a spring (not shown) coupled with power arm 26. The upward movement of firing arm 74 causes tab 76 to move within slot 78 of probe element 80 and strike its upper end. This causes probe element 80, and probe tip 84, to move upward with sufficient force to cause the ignition of flash lamp 20.

The upward movement of firing arm 74 releases tip 47 of power arm 26 from slot 72. As a result, latch surface 58 of tip portion 47 engages cylindrical stud 44 of shutter blade 22. Power arm 26 is spring loaded during its initial counterclockwise movement by spring 75, and upon engaging cylindrical stud 44, moves in a return motion towards its rest position carrying shutter blade 22 along with it. The downward movement of shutter blade 22 unblocks aperture 64 thereby commencing a photographic exposure. As end portion 49 of power arm element 48 contacts stud 51 secured to base plate 30, power arm element 48 is caused to rotate in a clockwise direction about pin 50 causing the disengagement of latch surface 58 from contact stud 44 of shutter blade 22. As a result, shutter blade 22 returns to its aperture blocking position under the influence of spring 60. An exposure interval is terminated with the latter motion. The above-described exposure mechanism is portrayed in detail in a copending application entitled "Exposure Control Mechanism with Mechanical Flash Synchronization," Ser. No. 50,583, filed June 29, 1970, by Bruce K. Johnson and assigned in common herewith.

The shutter mechanism components thus far described are operative to cause the unblocking and blocking of an exposure aperture 64 and the simultaneous firing of a percussively ignitable flash lamp 20.

Figure 9:
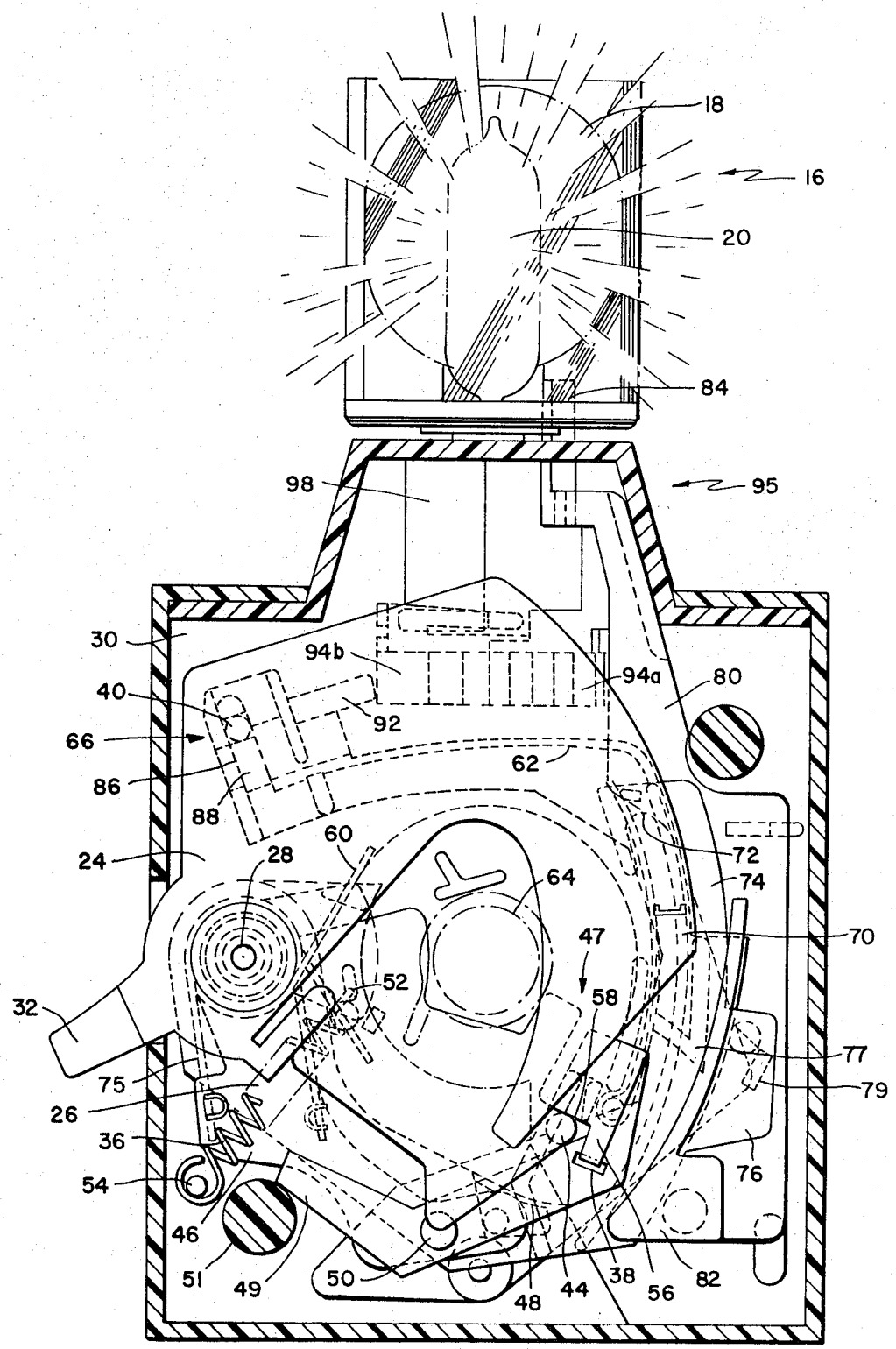
FIG. 9 is a front sectional view of the forward portion of a photographic camera as shown in FIG. 1 in another exposure orientation having portions shown in phantom to reveal internal structure.

Subsequent to an exposure interval, indexing drive is imparted from indexing end 66 of advancing arm 62 to a rotational support assembly for flash cube 16 as indicated generally at 95. Advancing arm 62 is drawn to, and momentarily retained at, its upward terminal position by the earlier described connection of its indexing end 66 with pin 40 in loading arm 24. This position is illustrated in FIG. 9. Pin 40 is in abutting engagement with a wall surface 86 of end 66 (FIG. 17) and has a locus of travel which causes it to ride up into slot 88 within end 66 during its counterclockwise movement. Pin 40, therefore, is at the upper portion of slot 88 when advancing arm 62 is in its terminal position. This relationship is best shown in FIG. 17. Loading arm 24 and advancing arm 62 are returned to their initial positions by a clockwise force exerted upon arm 62 by a spring 89. Spring 89 is spirally wound about a stud 90 secured to base plate 30. The clockwise force exerted upon advancing arm 62 is imparted to loading arm 24 through the engagement of pin 40 with wall surface 58 on indexing end 66. A rearwardly extending flange 92, formed integrally with indexing end 66, engages a contact surface 94 of support assembly 95 at an indexing portion 97, and urges it in a direction coinciding with the return motion of advancing arm 62. From this motion, flash cube 16 is rotated from one position to another, moving an unignited flash lamp into an operative position. Contact surface 94 is one of four such surfaces disposed about a periphery of an outer carriage support assembly shown generally at 96. Outer carriage 96 is rotationally supported within a fixed cylindrical housing 98, integrally mounted upon plate 99, and releasably supports flash cube 16.

Figure 3:
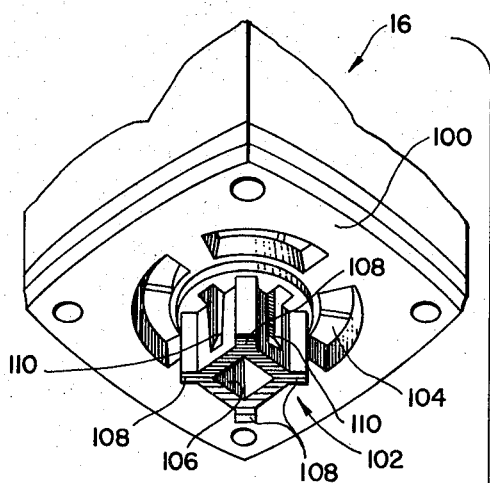
FIG. 3 is a bottom view of a portion of the apparatus as shown in FIG. 2.
Figure 3:
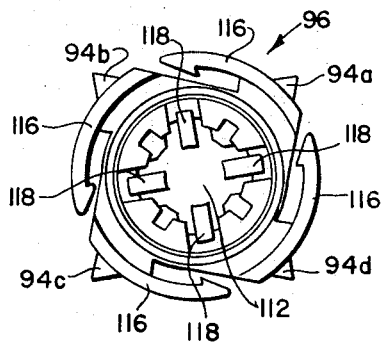
Figure 4:
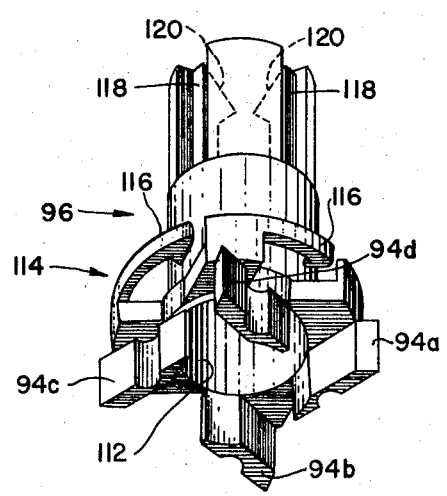
FIG. 4 is a perspective view of a portion of the apparatus of the invention.
Figure 4:
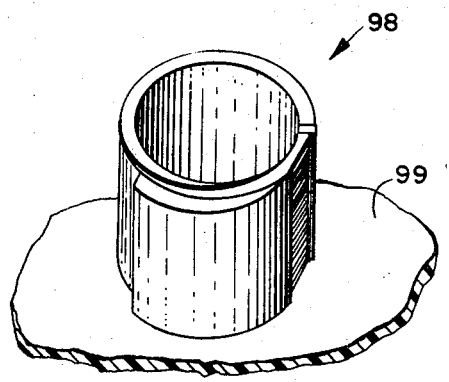
Figure 2:
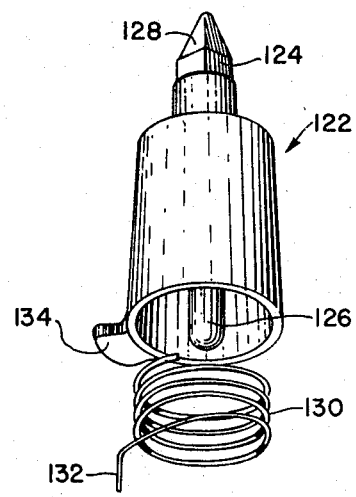
FIG. 2 is an exploded pictorial representation of the apparatus of the invention including the base or bottom portion of a flash cube.
Figure 5:
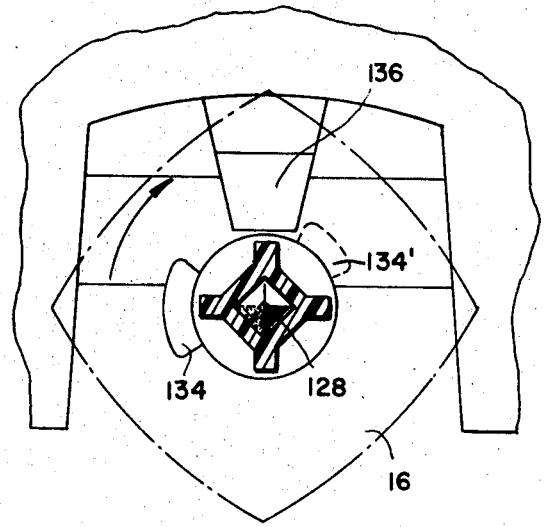
FIG. 5 is a top view showing a portion of the associated supporting structure of a flash cube at one stage of indexing rotation.

Referring additionally to FIGS. 2 and 3, the connecting base structure of flash cube 16 and the outer carriage support are shown in more elaborate detail. Flash cube 16 has a base portion 100 including a downwardly depending central post 102. Disposed about the outside of post 102 and contained within base 100 are four openings or slots 104 which allow probe end 84 to selectively engage and ignite spring-loaded firing pins within the flash cube assembly 16. Central post 102 is formed having a hollow portion 106 of a square cross-sectional shape. Extending outwardly from central post 102 are lugs as shown at 108. Between each of the lugs 108, the external surfaces of central post 102 are formed having indentations or depressions shown at 110.

Outer carriage support assembly 96 is formed as a right-circular cylinder having a hollow cylindrical interior 112. The lower end of outer carriage 96 is configured to form an outwardly extending general flange portion 114. Outer flange portion 114 is structured having contact surfaces 94 a–d and four detent elements, two of which are shown at 116.

Formed on the upward side of outer carriage support 96 are four resilient gripping members 118, the upward tip portion of each of which is configured to form a detent-like structure 120. Gripping members 118 are arranged in a quadrangular manner about carriage 96 such that the tip structure 120 of each will engage a given one of the indentations 110 formed in the central post 102 of flash cube 16.

An inner carriage assembly, rotationally mounted within outer carriage assembly 96 is shown generally at 122. Inner carriage 122 is formed having a hollow cylindrical configuration, the internal portion of which support two centrally disposed posts 124 and 126. The upper post at 124 is configured having a noncircular cross section suited to slideably fit and engage within the rectangular hollow interior 106 of central post 102. Upper post 124 terminates in a tapered end 128 which also fits within the hollow portion 106 of central post 102. A coil spring 130 is positioned within carriage 122, one end being secured thereto and its other end terminating in a hook portion 132. Extending outwardly from the bottom portion of inner carriage 122 is tab element 134, the inner carriage being so configured as to allow tab 134 to rotate below contact surfaces 94 when inner carriage 122 is inserted into outer carriage 96.

When flash cube 16 is mounted upon the dual carriage assembly, both inner carriage 122 and outer carriage 96 are mechanically united. For instance, inner carriage 122 fits within outer carriage 96 and engages flash cube 16 by means of the square shaft portion of upper post 124 which fits within the hollow portion 106 of central post 102 of flash cube 16. Flash cube 16 and outer carriage 96 are rotationally linked by the engagement of detents 120 with indentations 110. When properly engaged, flash cube 16, outer carriage 96, and inner carriage 122 are all coaxially rotatable as one. As a consequence, outer carriage 96 will rotate in correspondence with inner carriage 122 within the fixed cylindrical housing 98. When the assembly is caused to rotate, spring 130 is wound.

Figure 7:
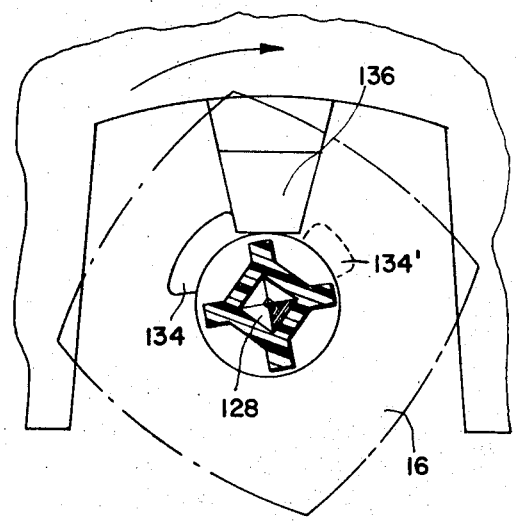
FIG. 7 is a top view showing portions of an associated supporting structure for a flash cube at another stage of rotation.
Figure 6:
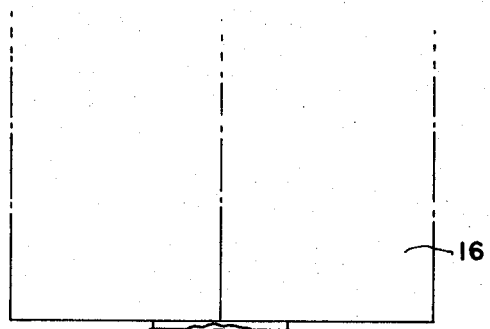
FIG. 6 is a side view, partially in section, of the apparatus as shown in FIG. 5.
Figure 8:
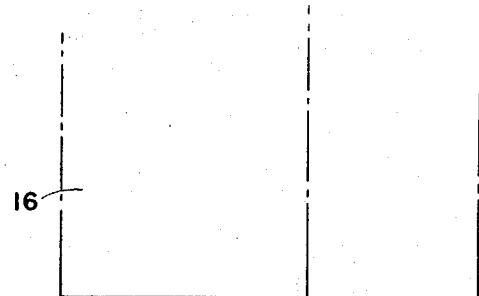
FIG. 8 is a side view, partially in section, of the apparatus as shown in FIG. 7.

Referring now to FIGS. 5 – 8, there is shown the operative association between inner carriage tab 134, flash cube 16, and tapered end 128. As the united assembly of carriages 96 and 122 and flash cube 16 is caused to rotate during a succession of exposure cycles, tab 134 of inner carriage 122 incrementally rotates in a counterclockwise direction. This rotation causes tab 134 to move from its abutment against a stop 136 to a terminal position indicated in phantom at 134', as shown in FIG. 7. Spring 130 is wound during this movement. Stop 136 is formed as an integral part of the camera housing 10 and limits the rotation of tab 134. As a consequence of this abutment, the united assembly cannot be rotated further, engaging flange 92 cannot be moved and the exposure mechanism will assume an inoperative status. When the expended flash cube 16 is removed from engagement with both carriages 96 and 122, carriage 122 is permitted to rotate independently of carriage 96 under the influence of coil spring 130, the latter having been loaded during the advancement of flash cube 16 between operative positions. Released for rotation, carriage 122 will turn in a clockwise direction until tab 134 reaches its abutting position with stop 136 as shown at 134 in FIG. 7.

If inner carriage tab 134 is in its initial or terminal abutment position with stop 136 and improper manual rotation is attempted in a counterclockwise or clockwise direction, respectively, severe damage may occur. To prevent such damage, there is provided an override feature which allows outer carriage 96 and flash cube 16 to rotate independently of inner carriage 122.

As mentioned previously, the square portion of post 124 slideably fits within the square hole 106 of central post 102 of flash cube 16. Accordingly, the two are rotationally united wherein rotation of one imparts rotation to the other. Additionally, flash cube 16 and outer carriage 96 are united through the engagement of resilient gripping members 118 with depressions 110, and carriages 96 and 122 through the mounting of flash cube 16.

If flash cube 16 is improperly rotated when tab 134 is in either of its abutting positions, the linkage between inner carriage 122 and outer carriage 96 is severed as flash cube 16 and carriage 96 are driven off the square portion of post 124 and onto tapered end 128. The severance of the linkage between the inner and outer carriages is a result of the disengagement of flash cube 16 with inner carriage 122. The square portion of upper post 124 is of sufficient length to slideably fit within, and engage, the central post 102 of flash cube 16 under normal indexing circumstances, but is of insufficient length to remain in engagement with central post 102 when the flash cube is improperly rotated. In the latter case, central post 102 of flash cube 16 slips off of the square portion of upper post 124 and onto tapered end 128. Since tapered end 128 has a smaller cross section than the square portion of post 124, there is a point along the tapered end where free rotation of flash cube 16 and outer carriage 96 will occur. This rotation is independent of inner carriage 122, which remains in its abutting position with stop 136, thereby preventing any damage to tab 134, coil spring 130, or central post 102. Operation of this override feature occurs only when tab 134 is in either of its two abutting positions with stop 136 and rotation is attempted in a direction which would move tab 134 into the position already taken by stop 136, i.e., referring to FIG. 7, when tab 134 is in a position as shown at 134 and further clockwise rotation is attempted, or when the tab is at 134' and further counterclockwise rotation is attempted.

Figure 10:
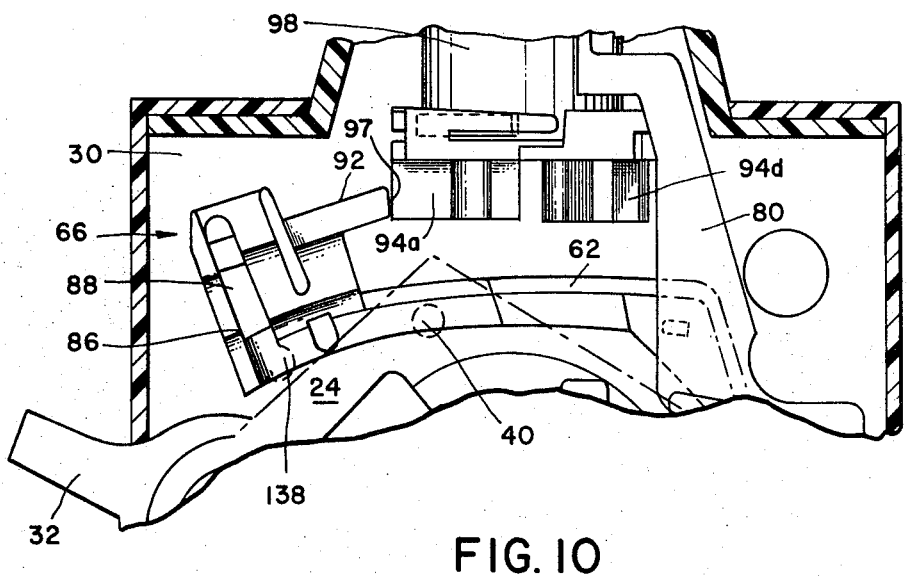
FIG. 10 is a front fragmentary view of an indexing and exposure mechanism showing one operational feature of the present invention.
Figure 11:
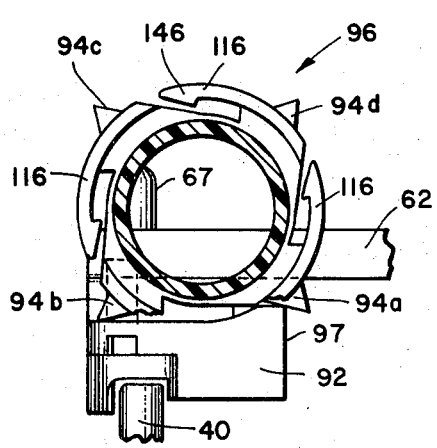
FIG. 11 is a top fragmentary view of a portion of an indexing mechanism during its pre-exposure or rest orientation.
Figure 12:
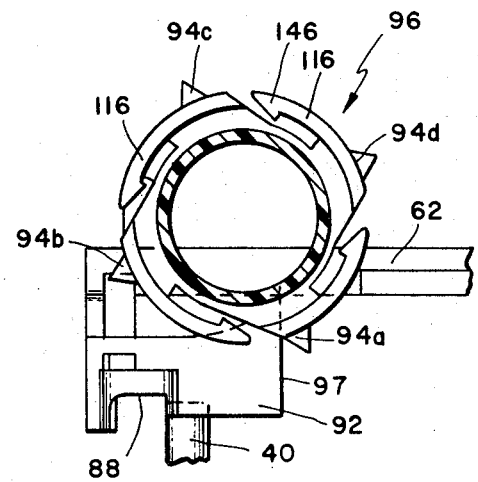
FIG. 12 is a top fragmentary view of a portion of an indexing mechanism during one stage of its indexing operation.

Reference is now made to FIGS. 10 – 12. If the rotational support assembly 95 is at its initial or rest position, as shown in FIG. 11, and improper manual rotation is attempted in a direction opposite to that of normal cube indexing, damage is prevented by a mechanical severance feature. For instance, there is provided a cut-away wall 138 on indexing end 66 which allows advancing arm 62 to move in a counterclockwise direction without concurrent movement of pin 40 and loading arm 24.

When flash cube 16 is grasped and turned, outer carriage 96 is rotated in the same direction due to its interlocking relationship with flash cube 16. The rotation of outer carriage 96 moves the integrally formed contact surfaces 94 a–d in a counterclockwise direction. That contact surface which is in an abutting relationship with engaging flange 92 forces indexing end 66 and advancing arm 62 out of their initial positions and into their terminal positions. This movement of advancing arm 62 is not transferred to loading arm 24, through pin 40, because of cut-away wall 138. Pin 40 of loading arm 24 is allowed to ride out of slot 88 and remain in its rest position.

The abutting contact surface 94a, as shown in FIG. 10, forces advancing arm 62 to its terminal position. Further rotation of outer carriage 96 moves contact surface 94a out of its abutting relationship with engaging flange 92 and advancing arm 62 returns to its initial position where it engages a next contact surface 94d. In this manner, independent advancing arm movement permits nondestructive rotation and obviates inadvertent shutter actuation or destruction when flash cube 16 is improperly rotated in a direction opposite to that of normal cube indexing.

Figure 13:
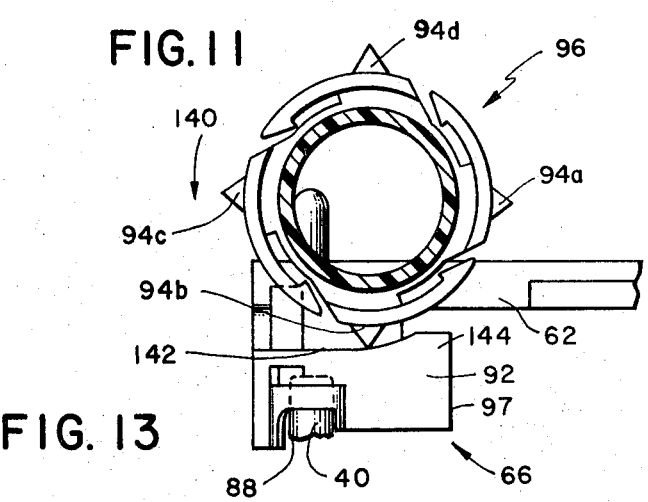
FIG. 13 is a top fragmentary view of a portion of an indexing mechanism during another stage of rotation.

Referring additionally to FIGS. 11 and 13, there is illustrated an override feature which permits improper manual rotation of flash cube 16 in a direction coinciding with that of normal flash cube indexing rotation. FIG. 11 shows the rest position of advancing arm 62 relative to outer carriage 96 and FIG. 13 shows the relative movement between the two members when a flash cube is improperly rotated. If outer carriage 96 is rotated from its rest position in a direction shown by arrow 140, contact surface 94b will commence to ride along surface 142 of engaging flange 92. This movement of contact surface 94b will gradually cam indexing end 66 outwardly from base plate 30. Slot 88 is configured having a deep enough portion to fully accept pin 40 when indexing end 66 is crammed to its furthest point without interfering with loading arm 24. Contact surface 94b rides along surface 142 until it reaches end 144 of surface 142 and falls off, thereby allowing advancing arm 62 to return to its rest position where it engages the next contact surface 94c. In this manner, improper flash cube rotation is permitted without damage to either advancing arm 62 or outer carriage assembly 96.

Figure 14:
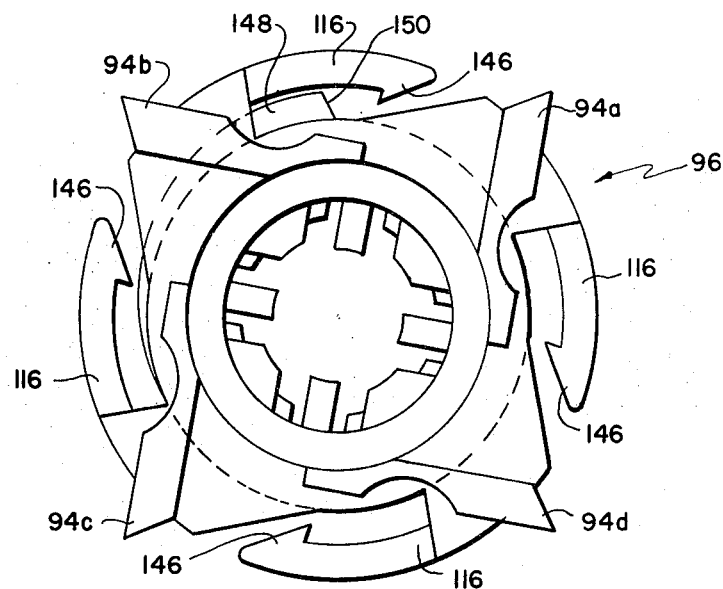
FIG. 14 is a top view of the apparatus of FIG. 3 showing a detent configuration at one stage of the operation of the apparatus of the invention.
Figure 15:
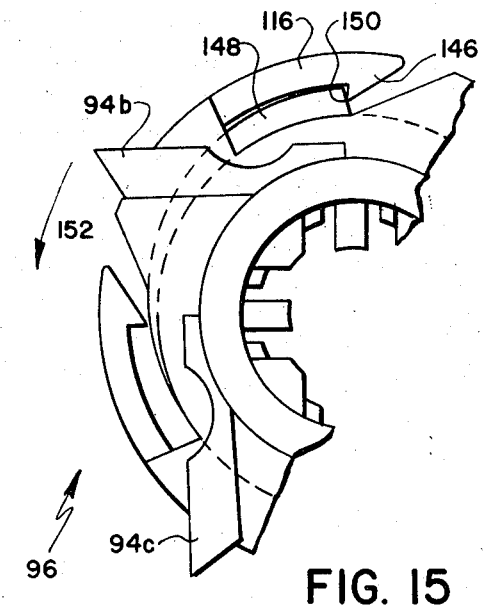
FIG. 15 is a top view of the apparatus of FIG. 3 showing another detent configuration at one stage of the operation of the apparatus of the invention.
Figure 16:
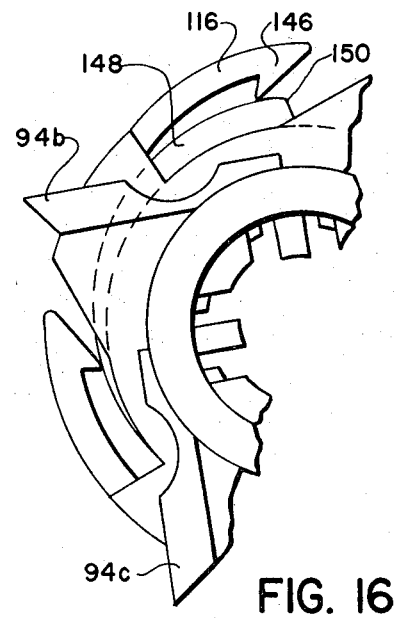
FIG. 16 is a top view of the apparatus of FIG. 3 showing still another detent configuration at one stage of the operation of the apparatus of the invention.

Looking additionally to FIGS. 14 – 16, another override feature is described. Equidistantly disposed about a periphery of outer carriage 96 are four flexible detent elements 116. Formed as an integral part of each detent element 116 is a hook portion 146 rotationally engageable with a cam surface 148. Cam surface 148 is integrally formed about fixed cylindrical housing 98 through which outer carriage 96 is inserted. Cylindrical housing 98 is integrally formed upon plate 99. Rotation of outer carriage 96 is momentarily arrested when hook portion 146 engages the drop-off portion of cam surface 148 for indexably positioning outer carriage 96 and flash cube 16. When this position has been established, as shown in FIG. 1, one of the flash lamps contained within flash cube 16 is orientated toward the scene to be photographed. This engagement is maintained until such time as flash lamp ignition occurs and a new flash lamp is indexed into the operable position. During normal indexing, detents 116 and end portions 146 are rotated in a clockwise direction, as seen in FIG. 14, falling off cam surface 148. Cam surface 148 contains a bevelled drop-off surface 150 which is configured to form an oblique angle with surface 148. Bevelled surface 150 has a function not only of momentarily arresting the rotation of outer carriage 96 but, additionally, of providing an override feature if outer carriage 96 is improperly rotated in a counterclockwise direction.

Particular reference is now made to FIG. 15 which illustrates the indexing engagement position between bevelled surface 150 and detent hook portion 146. When in this configuration, outer carriage 96 orients a flash lamp contained within flash cube 16 toward a scene to be photographed. If improper flash cube rotation is now attempted in a direction opposite to that of normal cube indexing, as shown by arrow 152, detent hook 146 will ride over bevelled surface 150 onto cam surface 148. This severs the indexing engagement between detent 116 and cam surface 148. The oblique angle of bevelled surface 150 and the flexible character of detent element 116 permit this operation. Should the angle between bevelled surface 150 and cam surface 148 be acute, however, detent hook portion 146 would not ride over bevelled surface 150 and detent element 116 or hook portion 142 would be broken.

While the configuration of bevelled surface 150 allows for the override operation, it retains its capability of indexably positioning outer carriage 96, through detent elements 116, thereby operably positioning successive ones of the flash lamps. In this manner, improper counterclockwise flash cube rotation is permitted without damage to either detent hook portion 146, outer carriage assembly 96, or flash cube 16.

Operation

That override feature which will be operational in the event of misuse is dependent upon the direction of improper rotation and the position of the flash cube and support assembly when such rotation is attempted. One position occurs when inner carriage 122 is in abutting engagement with stop 136. This orientation is present when a flash cube has just been inserted or when the flash cube has been totally expended. If the former is the case and flash cube 16 is improperly rotated in a direction opposite to that of normal cube indexing, flash cube 16 and outer carriage 96 will ride up and rotate about tapered end 128 of inner carriage 122. Due to the disengagement of inner carriage 122 and flash cube 16, inner carriage 122 will remain stationary, preventing damage to either tab 134 or flash cube 16. The above arrangement repeats when the flash cube has been totally expended and tab 134 is in a position shown in FIG. 7 at 134'. In this case, however, improper rotation is in a direction coinciding with that of normal cube indexing. In each case, the operation of the override feature is the same; inner carriage 122 and flash cube 16 disengage thereby allowing the latter to rotate independently of the former.

The remaining override features are operational when flash cube 16 and inner carriage tab 134 are in any position, but depend upon which direction the flash cube is improperly rotated.

If improper rotation is attempted in a direction coinciding with that of normal cube indexing, contact surfaces 94 rotationally cam indexing end 66 outwardly from base plate 30 an adequate distance to allow outer carriage 96 to rotate. Additionally, the indexing association between advancing arm 62 and contact surfaces 94 is severed and outer carriage 96 and flash cube 16 rotate without damage of advancing arm 62 or rotational support assembly 95.

If rotation is attempted in a direction opposite to that of normal cube indexing, another override feature is operational to sever the operational engagement between advancing arm 62 and loading arm 24. This severance allows advancing arm 62 to be moved, under the rotational influence of contact surfaces 94, independently of loading arm 24, thereby preventing accidental shutter actuation or damage. Additionally, with the same direction of improper rotation, there is provided an override feature which nondestructively severs the indexing engagement between detent elements 116 and cam surface 148. Surface 148 is configured having a bevelled surface 150, formed at an oblique angle with cam surface 148. The cooperation between hook portion 146 of detent 116 and bevelled surface 150 serves to retain successive flash lamps in an operative position. The configuration of bevelled surface 150 and hook portion 146 allows the latter to nondestructively ride up upon cam surface 148 when sufficient rotational force is imparted to outer carriage 96 through the improper rotation of flash cube 16.

In all features of the invention, including the preferred embodiments, the indexing association, while temporarily severed, is re-instituted immediately after improper rotation is completed, thereby allowing the indexing, and exposure mechanisms to resume proper operation.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising, in combination:
   an exposure mechanism operable in conjunction with artificial illumination generated from the ignition of a lamp within a packaged multi-lamp flash assembly to photographically expose photosensitive material; and
   rotational support means in operative association between said exposure mechanism and said multi-lamp flash assembly for releasably retaining and rotating said assembly in a given direction to indexably position successive ones of said lamps at an operative position when actuated in response to the operation of said exposure mechanism, said rotational support means being operative to selectively and nondestructively override from association between said exposure mechanism and said multi-lamp assembly when said multi-lamp assembly is otherwise rotated.

2. The photographic apparatus of claim 1 in which said exposure mechanism includes:
   advancing means movable between initial and terminal positions and engageable in driving relationship with said rotational support means at said terminal position for rotating said support means to position said lamps at said operative position;
   loading means engageable with said advancing means for moving said advancing means to said terminal position during a photographic cycle; and
   said advancing means being operative to remove from said engagement with said loading means when said multi-lamp flash assembly is otherwise rotated in a direction opposite said given direction.

3. The photographic apparatus of claim 1 in which said exposure mechanism includes:
   advancing means in abutting contact with said rotational support means and movable between initial and terminal positions to engage and rotate said rotational support means to locate select ones of said lamps at said operative position;
   loading means engageable with said advancing means for moving said advancing means into said terminal position to effect said rotational support means engagement;
   said advancing means being operative to remain in said initial position and to nondestructively flex within said loading means engagement when said multi-lamp assembly is otherwise rotated in said given direction.

4. The photographic apparatus of claim 1 in which said exposure mechanism includes:
   advancing means movable in abutting contact with said rotational support means and movable between initial and terminal positions to engage and rotate said rotational support means to locate select ones of said lamps at said operative position;
   loading means engageable with said advancing means for moving said advancing means into said terminal position to effect said rotational support means engagement; and
   said advancing means being operative to remain in said initial position and to nondestructively flex within said loading means engagement when said multi-lamp flash assembly is otherwise rotated in said given direction, and to remove from said loading means engagement when said multi-lamp flash assembly is otherwise rotated in a direction opposite said given direction.

5. The photographic apparatus of claim 1 wherein said rotational support means includes carriage means for rotatably supporting said multi-lamp flash assembly and having a portion slideably insertable within in rotational driving engagement with said multi-lamp flash assembly and operative to nondestructively slideably separate from said engagement when torsionally stressed when said multi-lamp assembly is otherwise moved as a result of externally generated rotation.

6. An exposure mechanism for photographic apparatus comprising, in combination:
   carriage means for supporting a packaged multi-lamp flash assembly and movable in a given direction to rotate said assembly and indexably position successive ones of lamps within said assembly at an operative position;
   shutter means actuable to establish an exposure interval;
   loading means movable from a pre-exposure position for actuating said shutter means;
   advancing means connectable in abutting engagement with said loading means and said carriage means for moving said carriage means in said given direction simultaneously with the return movement of said loading means toward said pre-exposure position, said advancing means being configured to disengage from said abutting connection with said loading means when said multi-lamp flash assembly is rotated in a direction opposite said given direction as a result of externally generated rotation and not in response to actuation of said shutter means.

7. The exposure mechanism of claim 6 wherein said advancing means is operative to move between an initial and a terminal position to abuttably engage and move said carriage means in said given direction;
   said loading means is operative to move said advancing means into said terminal position to effect said carriage means engagement; and
   said advancing means being operative to remain in said initial position and to flex nondestructively within said loading means engagement when said multi-lamp assembly is otherwise rotated in said given direction.

8. Photographic apparatus comprising, in combination:
   an exposure mechanism operable in conjunction with artificial illumination generated from the ignition of a lamp within a packaged multi-lamp flash assembly to photographically expose photosensitive material; and
   rotational support means in operative association between said exposure mechanism and said multi-lamp flash assembly for releasably retaining and rotating said assembly in a given direction to indexably position successive ones of said lamps at an operative position when properly actuated in association with the operation of said exposure mechanism, said rotational support means including indexing detent means operative to engage an arresting surface fixed upon said apparatus when said flash assembly is in said operative position, said indexing detent means and arresting surface being mutually configured to flexibly and nondestructively remove from said engagement when said lamp assembly is rotated in a direction opposite said given direction.

9. Photographic apparatus comprising, in combination:
   an exposure mechanism operable in conjunction with artificial illumination generated from the ignition of a lamp within a packaged multi-lamp flash assembly to photographically expose photosensitive material; and
   rotational support means in operative association between said exposure mechanism and said multi-lamp flash assembly for releasably retaining and rotating said assembly in a given direction to indexably position successive ones of said lamps at an operative position when properly actuated in association with the operation of said exposure mechanism, said rotational support means including carriage means for rotatably supporting said multi-lamp flash assembly, said carriage means being configured having a stem element an end portion of which is slideably insertable in rotational driving engagement within said multi-lamp flash assembly, said end portion being tapered and operative to slideably separate from said engagement when torsionally stressed as a result of externally generated improper rotation independent of said exposure mechanism.

10. Photographic apparatus comprising, in combination:
    rotational support means in operative association with lamps contained within a packaged multi-lamp flash assembly for releasably retaining and rotating said assembly in a given direction to indexably position successive ones of said lamps at an operative position when properly actuated, said rotational support means including carriage means for rotatably supporting said multi-lamp flash assembly and having a portion slideably insertable within and in rotational driving engagement with said multi-lamp flash assembly and having a portion slideably insertable separate from said engagement when torsionally stressed as a result of improver actuation; and
    an exposure mechanism operable in conjunction with artificial illumination generated from the ignition of a lamp within said multi-lamp flash assembly to photographically expose photosensitive material, said exposure mechanism including:
    advancing means movable in abutting contact with said rotational support means and movable between initial and terminal positions to engage and rotate said rotational support means to locate select ones of said lamps at said operative position,
    loading means engageable with said advancing means for moving said advancing means into said terminal position to effect said rotational support means engagement, and
    said advancing means being operative to remain in said initial position and to nondestructively flex within said loading means engagement when said multi-lamp flash assembly is improperly rotated in said given direction and to remove from said loading means engagement when said multi-lamp flash assembly is improperly rotated in a direction opposite said given direction.

11. The photographic apparatus of claim 10 in which said carriage means is configured having a stem element, an end portion of which is slideably insertable in rotational driving engagement within said multi-lamp flash assembly, said end portion being tapered and operative to slideably separate from said engagement when torsionally stressed as a result of said improper movement.

12. The photographic apparatus of claim 11 in which said rotational support means includes indexing detent means operative to engage an arresting surface fixed upon said apparatus when said flash assembly is in a said operative position, said indexing detent means and arresting surface being mutually configured to flexibly and nondestructively remove from said engagement when said multi-lamp assembly is improperly rotated in a direction opposite said given direction.

13. Photographic apparatus comprising, in combination:
    carriage means for supporting a packaged multi-lamp flash assembly and movable in a given direction to properly rotate said assembly and indexably position successive ones of lamps within said assembly at an operative position, said carriage means having an outer carriage means for rotationally supporting said multi-lamp flash assembly, and an inner carriage means slideably insertable within said outer carriage means and in driven engagement with said multi-lamp flash assembly for limiting the movement of said multi-lamp flash assembly, said inner carriage means being configured having a tapered end portion slideably insertable within said multi-lamp flash assembly, said tapered end portion being operative to slideably separate from said driven engagement when said end portion is torsionally stressed as a result of improper rotation of said multi-lamp flash assembly;

shutter means actuable to establish an exposure interval;

loading means movable from a pre-exposure position for actuating said shutter means; and advancing means connectable in abutting engagement with said loading means and said carriage means for moving said carriage means in said given direction simultaneously with the return movement of said loading means toward said pre-exposure position, said advancing means being configured to disengage from said abutting connection with said loading means when said multi-lamp flash assembly is improperly rotated in a direction opposite said given direction.

14. Photographic apparatus comprising, in combination:

carriage means for supporting a packaged multi-lamp flash assembly and movable in a given direction to properly rotate said assembly and indexably position successive ones of lamps within said assembly at an operative position, said carriage means including resilient detent means indexably engageable with an arresting surface fixed upon said apparatus when a said lamp within said flash assembly is in said operative position, said resilient detent means and said arresting surface being mutually configured to flexibly and nondestructively override from said indexable engagement when said multi-lamp flash assembly is improperly rotated;

shutter means actuable to establish an exposure interval;

loading means movable from a pre-exposure position for actuating said shutter means; and advancing means connectable in abutting engagement with said loading means and said carriage means for moving said carriage means in said given direction simultaneously with the return movement of said loading means toward said pre-exposure position, said advancing means being configured to disengage from said abutting connection with said loading means when said multi-lamp flash assembly is improperly rotated in a direction opposite said given direction.

15. The exposure mechanism of claim 14 in which said arresting surface is formed having an inclined surface thereon indexably engageable with said resilient detent means, said inclined surface and said resilient detent means being mutually configured to nondestructively disengage from said indexable engagement when said multi-lamp flash assembly is improperly rotated.

* * * * *